United States Patent
Tsuda et al.

(10) Patent No.: US 10,963,695 B2
(45) Date of Patent: Mar. 30, 2021

(54) IRIS DETECTION DEVICE, IRIS DETECTION METHOD, AND RECORDING MEDIUM ONTO WHICH IRIS DETECTION PROGRAM IS RECORDED

(71) Applicant: DENSO CORPORATION, Kariya (JP)

(72) Inventors: Yoshiyuki Tsuda, Kariya (JP); Toshiyuki Konishi, Kariya (JP); Hiroshi Doi, Tokyo (JP); Ari Widodo, Tokyo (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 16/352,910

(22) Filed: Mar. 14, 2019

(65) Prior Publication Data

US 2019/0213409 A1 Jul. 11, 2019

Related U.S. Application Data

(63) Continuation of application No. PCT/JP2017/031854, filed on Sep. 5, 2017.

(30) Foreign Application Priority Data

Sep. 14, 2016 (JP) .............................. JP2016-179525

(51) Int. Cl.
*G06K 9/00* (2006.01)
*G06T 7/60* (2017.01)
(Continued)

(52) U.S. Cl.
CPC ....... *G06K 9/00604* (2013.01); *G06K 9/0061* (2013.01); *G06K 9/00617* (2013.01);
(Continued)

(58) Field of Classification Search
CPC ............. G06K 9/00604; G06K 9/0061; G06K 9/00617; G06K 9/00597; G06K 9/00281;
(Continued)

(56) References Cited

U.S. PATENT DOCUMENTS 7,593,550 B2 * 9/2009 Hamza ............... G06K 9/00597
382/117
7,717,561 B2 * 5/2010 Knaan ...................... G03B 3/00
351/210
(Continued)

FOREIGN PATENT DOCUMENTS

JP 2001101429 A 4/2001
JP 2007029712 A 2/2007
(Continued)

OTHER PUBLICATIONS

"Iris Segmentation System Based on Approximate Feature Detection with Subsequent Refinements"; Ivan Matveev, 2014 22nd International Conference on Pattern Recognition (pp. 1704-1709) (Year: 2014).*
(Continued)

*Primary Examiner* — Michael S Osinski
(74) *Attorney, Agent, or Firm* — Harness, Dickey & Pierce, P.L.C.

(57) ABSTRACT

An iris detection device includes a candidate detection unit, a candidate narrowing-down unit, and an iris specifying unit. The candidate detection unit detects circular regions as iris candidates from images captured by an infrared camera. The candidate narrowing-down unit narrows down the detected iris candidates into a predetermined number of iris candidates with use of data items of images of surroundings of each of the iris candidates. The iris specifying unit specifies one of the predetermined number of iris candidates obtained by the narrowing-down as an iris by matching between gradients of a contour of each of the predetermined number of iris candidates and iris templates.

7 Claims, 6 Drawing Sheets

US 10,963,695 B2
Page 2

(51) Int. Cl.
 *G06T 7/00* (2017.01)
 *B60K 35/00* (2006.01)
(52) U.S. Cl.
 CPC ............... *G06T 7/00* (2013.01); *G06T 7/60* (2013.01); *B60K 35/00* (2013.01); *B60K 2370/21* (2019.05)
(58) Field of Classification Search
 CPC ...... G06K 9/00906; G06K 9/036; G06K 9/52; G06K 9/685; G06T 7/60; G06T 7/00; G06T 7/75; G06T 7/73; G06T 2207/20084; G06T 2207/30201; G06T 2207/30041; B60K 2370/21; B60K 35/00; G06F 3/013; G06F 21/32; A61B 3/113; A61B 3/112; A61B 3/0008; A61B 3/0025; A61B 3/111; A61B 3/14; A61B 5/163
 See application file for complete search history.

(56) References Cited

U.S. PATENT DOCUMENTS

| | | | | | |
|---|---|---|---|---|---|
| 8,064,647 | B2* | 11/2011 | Bazakos | ............... | G06K 9/0061 382/117 |
| 8,090,157 | B2* | 1/2012 | Hamza | ............... | G06K 9/00597 382/115 |
| 8,442,276 | B2* | 5/2013 | Hamza | ............... | G06K 9/0061 382/117 |
| 8,472,681 | B2* | 6/2013 | Hamza | ............... | G06K 9/00617 382/117 |
| 8,630,464 | B2* | 1/2014 | Whillock | ............... | G06K 9/03 382/117 |
| 8,705,808 | B2* | 4/2014 | Determan | ............... | G06K 9/00604 382/117 |
| 8,742,887 | B2* | 6/2014 | Whillock | ............... | G07C 9/257 340/5.2 |
| 9,396,394 | B1* | 7/2016 | Solh | ............... | G06K 9/0061 |
| 2004/0037452 | A1* | 2/2004 | Shin | ............... | G06K 9/00597 382/117 |
| 2006/0147094 | A1* | 7/2006 | Yoo | ............... | G06K 9/0061 382/117 |
| 2006/0291702 | A1* | 12/2006 | Miessbacher | ............... | G06K 9/00604 382/117 |
| 2007/0036396 | A1* | 2/2007 | Sugita | ............... | A61B 3/112 382/117 |
| 2007/0071287 | A1* | 3/2007 | Sugita | ............... | G06K 9/0061 382/117 |
| 2007/0123794 | A1* | 5/2007 | Togino | ............... | A61B 3/112 600/558 |
| 2008/0037835 | A1* | 2/2008 | Lee | ............... | G06K 9/0061 382/117 |
| 2008/0219515 | A1* | 9/2008 | Namgoong | ............... | G06K 9/0061 382/117 |
| 2010/0054548 | A1* | 3/2010 | Inada | ............... | G06K 9/0061 382/117 |
| 2010/0085539 | A1* | 4/2010 | Harada | ............... | A61B 3/112 351/206 |
| 2011/0267447 | A1* | 11/2011 | Su | ............... | G06K 9/0061 348/78 |
| 2012/0242820 | A1* | 9/2012 | Hanna | ............... | G06K 9/00597 348/78 |
| 2012/0275707 | A1* | 11/2012 | Bergen | ............... | G06K 9/00597 382/199 |
| 2012/0308089 | A1* | 12/2012 | Lee | ............... | G06K 9/00597 382/117 |
| 2014/0039273 | A1* | 2/2014 | Kim; Sung Min | ............... | G02B 27/0093 600/249 |
| 2014/0063221 | A1 | 3/2014 | Mohanakrishnan et al. | | |
| 2014/0226875 | A1* | 8/2014 | Lefebvre | ............... | G06T 7/149 382/117 |
| 2015/0131051 | A1* | 5/2015 | Huang | ............... | A61B 3/0025 351/206 |
| 2015/0160726 | A1 | 6/2015 | Sullivan | | |
| 2015/0287206 | A1* | 10/2015 | Ebisawa | ............... | A61B 3/113 382/154 |
| 2015/0294464 | A1* | 10/2015 | Kim | ............... | G06K 9/00597 382/117 |
| 2016/0026847 | A1* | 1/2016 | Vugdelija | ............... | G06K 9/6218 382/103 |
| 2016/0364610 | A1* | 12/2016 | Jung | ............... | G06K 9/00617 |
| 2017/0105619 | A1* | 4/2017 | Ebisawa | ............... | A61B 3/0025 |
| 2017/0293354 | A1* | 10/2017 | Lu | ............... | G06K 9/00604 |
| 2017/0344110 | A1* | 11/2017 | Yoshioka | ............... | A61B 3/152 |
| 2018/0032813 | A1* | 2/2018 | Lee | ............... | G06K 9/00604 |
| 2018/0032815 | A1* | 2/2018 | Lee | ............... | G06K 9/00604 |
| 2018/0168446 | A1* | 6/2018 | Kim | ............... | G07C 9/37 |
| 2018/0174309 | A1* | 6/2018 | Hoshino | ............... | A61B 3/113 |
| 2018/0204058 | A1* | 7/2018 | Yoo | ............... | G06K 9/00617 |
| 2018/0333092 | A1* | 11/2018 | Roshan | ............... | A61B 5/18 |
| 2019/0121427 | A1* | 4/2019 | Qin | ............... | G06F 3/013 |
| 2020/0012840 | A1* | 1/2020 | Kim | ............... | G06K 9/4642 |
| 2020/0089951 | A1* | 3/2020 | Inoue | ............... | G06K 9/00617 |

FOREIGN PATENT DOCUMENTS

| | | |
|---|---|---|
| JP | 2014048962 A | 3/2014 |
| JP | 2016512765 A | 5/2016 |

OTHER PUBLICATIONS

"Automatic segmentation of iris images for the purpose of identification"; A. Zaim, IEEE International Conference on Image Processing 2005 (vol. 3, pp. III-273) (Year: 2005).*

"A novel Iris segmentation method based on balloon active contour"; Talebi, S.M., 2010 6th Iranian Conference on Machine Vision and Image Processing (pp. 1-5) (Year: 2010).*

* cited by examiner

FIG.3A

GRADIENT IN X-DIRECTION: Ix

| -1 | 0 | 1 |
|---|---|---|
| -2 | 0 | 2 |
| -1 | 0 | 1 |

FIG.3B

GRADIENT IN Y-DIRECTION: Iy

| -1 | -2 | -1 |
|---|---|---|
| 0 | 0 | 0 |
| 1 | 2 | 1 |

IRIS DETECTION DEVICE, IRIS DETECTION METHOD, AND RECORDING MEDIUM ONTO WHICH IRIS DETECTION PROGRAM IS RECORDED

CROSS-REFERENCE TO RELATED APPLICATIONS

The present application is a continuation application of International Patent Application No. PCT/JP2017/031854 filed on Sep. 5, 2017, which designated the U.S. and claims the benefit of priority from Japanese Patent Application No. 2016-179525 filed on Sep. 14, 2016. The entire disclosures of all of the above applications are incorporated herein by reference.

FIELD

The present disclosure relates to a technology for detecting an iris from images.

BACKGROUND

As a method of assisting a driver in driving to operate in-vehicle devices without forcing the driver to release a steering wheel, a method including using lines of sight of the driver has been proposed. In this regard, as a method of detecting the lines of sight of the driver, a method of detecting an iris of the driver has been proposed.

SUMMARY

According to the present disclosure, there is provided a technology for detecting an iris with high accuracy from images. In the present disclosure, an iris detection device detects circular regions as iris candidates from images captured by a camera. The iris detection device narrows down the detected iris candidates into a predetermined number of iris candidates with use of data items of images of surroundings of each of the iris candidates. The iris detection device specifies one of the predetermined number of iris candidates obtained by the narrowing-down as an iris by matching between gradients of a contour of each of the predetermined number of iris candidates and iris templates.

BRIEF DESCRIPTION OF THE DRAWINGS

In the accompanying drawings:

FIG. 3A is a table showing a Sobel filter for calculating a gradient in an X-direction;

FIG. 3B is a table showing a Sobel filter for calculating a gradient in a Y-direction;

DETAILED DESCRIPTION OF THE PREFERRED EMBODIMENTS

Figure 1:
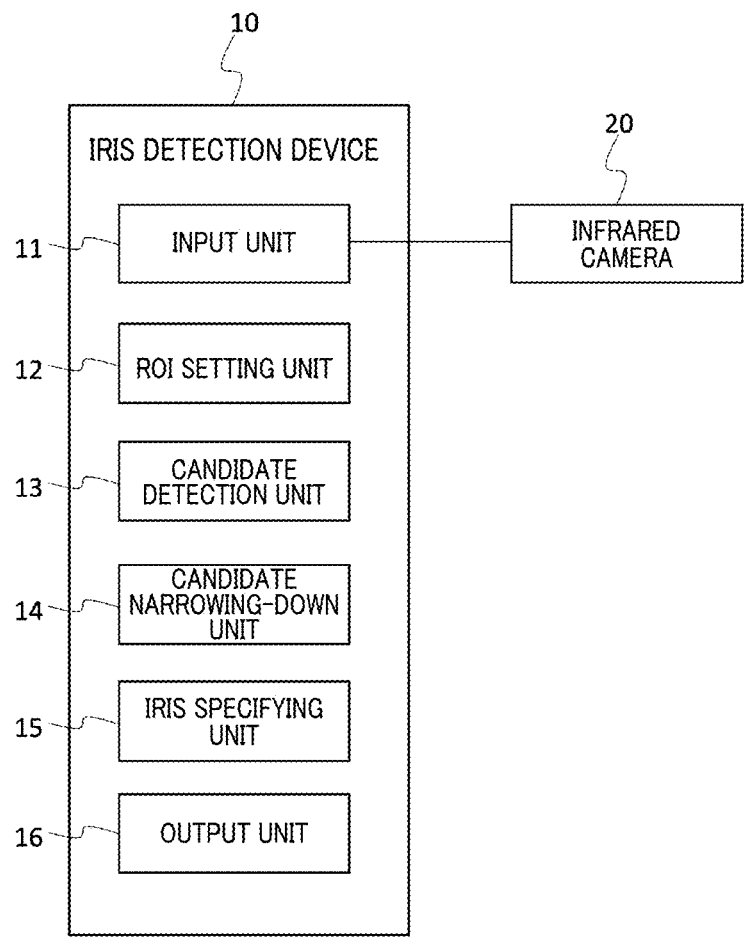
FIG. 1 is a diagram showing a configuration of an iris detection device according to a first embodiment.

The inventors of the present disclosure have studied the following technique as an iris detection technique capable of detecting an iris with high accuracy from images.

As a device of detecting the lines of sight of the driver, a line-of-sight detection device has been proposed. The line-of-sight detection device includes an iris detection unit that acquires a center position of an iris from image data items input from an image acquisition unit. However, actually, it is not easy to detect the iris. For example, the iris may not be detected due, for example, to wearable items such as eyeglasses and to changes between light and darkness. Further, a detected position of the iris may be shifted.

Through studies, the inventors of the present application have found that, when the plurality of iris candidates are narrowed down with use of the data items of the images of the surroundings of each of the iris candidates, an actual iris is highly probably contained in the top predetermined number of iris candidates. Based on this finding, the inventors of the present application have devised a technology as follows.

According to an aspect of the technology disclosed herein, there is provided an iris detection device including a candidate detection unit, a candidate narrowing-down unit, and an iris specifying unit. The candidate detection unit detects circular regions as iris candidates from images captured by a camera. The candidate narrowing-down unit narrows down the detected iris candidates into a predetermined number of iris candidates with use of data items of images of surroundings of each of the iris candidates. The iris specifying unit specifies one of the predetermined number of iris candidates obtained by the narrowing-down as an iris by matching between gradients of a contour of each of the predetermined number of iris candidates and iris templates. That is to say, the iris detection device according to the present disclosure causes the candidate narrowing-down unit to perform the narrowing-down into the predetermined number of iris candidates. Then, the iris detection device causes the iris specifying unit to specify the one of the predetermined number of iris candidates obtained by the narrowing-down as the iris by a technique different from a narrowing-down technique. With this, in this iris detection device, the iris can be detected with high accuracy from the images.

In the iris detection device according to the present disclosure, the iris specifying unit may perform the matching with use of a different one of the iris templates in accordance with positions of the iris.

The position of the iris in an eye varies in accordance with eye movements at times of looking to the right and the left. In addition, which parts of the iris are covered with eyelids varies in accordance with the positions of the iris. For example, when the iris is located at a center of the eye, only upper and lower sides of the iris are partially covered with the eyelids. Meanwhile, when the iris is located on the right, not only the upper and the lower sides of the iris, but also a part of from the obliquely lower right to the right of the iris is covered with the eyelids. In this case, when the matching with the iris templates is performed even with respect to the right-hand side of the iris, which is covered with the eyelids, results of the matching are influenced by the eyelids. According to the technology disclosed herein, the iris detection device uses the different templates in accordance with the positions of the iris. Thus, in the iris detection device according to the present disclosure, the matching can be properly performed.

In the iris detection device according to the present disclosure, the iris specifying unit may specify the iris not by performing the matching but based on evaluation values at a time when the candidate detection unit detects the iris candidates.

The candidate detection unit detects the circular regions as the iris candidates. The iris specifying unit utilizes the evaluation values at the time when the iris candidates are detected. With this, in the iris detection device according to the present disclosure, the iris can be specified from the iris candidates obtained by the narrowing-down.

In the iris detection device according to the present disclosure, ROIs (regions of interest) may be set around regions around the eye in the images captured by the camera, and the iris candidates may be detected from insides of the set ROIs.

Thus, the iris detection device according to the present disclosure only needs to search the set ROIs for the iris. With this, in this iris detection device, processing load at the time of detecting the iris can be reduced.

According to another embodiment of the technology disclosed herein, there is provided an iris detection method for detecting, by an iris detection device, an iris from images captured by a camera, the method including a detecting step, a narrowing-down step, and a specifying step. In the detecting step, the iris detection device detects circular regions as iris candidates from the images. In the narrowing-down step, the iris detection device narrows down the detected iris candidates into a predetermined number of iris candidates with use of data items of images of surroundings of each of the iris candidates. In the specifying step, the iris detection device specifies one of the predetermined number of iris candidates obtained by the narrowing-down as the iris by matching between gradients of a contour of each of the predetermined number of iris candidates and iris templates.

According to still another embodiment of the technology disclosed herein, there is provided an iris detection program for detecting an iris from images captured by a camera, the program causing a computer to perform a detecting step, a narrowing-down step, and a specifying step. In the detecting step, circular regions are detected as iris candidates from the images. In the narrowing-down step, the detected iris candidates are narrowed down into a predetermined number of iris candidates with use of data items of images of surroundings of each of the iris candidates. In the specifying step, one of the predetermined number of iris candidates obtained by the narrowing-down is specified as the iris by matching between gradients of a contour of each of the predetermined number of iris candidates and iris templates. This iris detection program is recorded onto a computer-readable recording medium (non-transitory tangible recording medium).

By the iris detection device, the iris detection method, the computer-readable recording medium onto which the iris detection program is recorded, and the like according to the technology disclosed herein, an iris can be detected with high accuracy from images.

The foregoing and other features and advantages of the present disclosure will become more apparent in the light of the following detailed description of preferred embodiments thereof as discussed and illustrated in the accompanying drawings.

Now, embodiments of an iris detection device according to an aspect of a technology disclosed herein are described with reference to the drawings.

First Embodiment

FIG. 1 is a diagram showing a configuration of an iris detection device 10 according to a first embodiment. The iris detection device 10 according to this embodiment is connected to an infrared camera 20. The infrared camera 20 is, for example, installed in a vehicle and pointed at a driver. The infrared camera 20 captures the face or the chest and parts thereabove of the driver. In this embodiment, the infrared camera 20 is used such that the face of the driver in driving is properly captured even at night.

The iris detection device 10 includes an input unit 11, a ROI setting unit 12, a candidate detection unit 13, a candidate narrowing-down unit 14, an iris specifying unit 15, and an output unit 16. The input unit 11 is connected to the infrared camera 20, and receives images captured by the infrared camera 20.

The input unit 11 accepts the images captured by the infrared camera 20. The ROI setting unit 12 sets ROIs around regions of eyes or the face of the driver in the images input to the input unit 11. As an example of methods of detecting regions of the face from the images, there may be mentioned detecting bright regions from the images, and setting these regions as the regions of the face. Further, as an example of methods of detecting the regions of the eyes from the images, there may be mentioned a method as follows. Specifically, it is assumed that regions of irises and the eyes in an image at a time point t−1 have been specified. In this case, with use of information items of a position and a movement of each of the specified regions of the eyes, regions of the eyes in an image at a time point t may be detected. The ROI setting unit 12 sets the ROIs around the regions of the face and the eyes, which are detected as described above. In this way, in this embodiment, the iris detection device 10 only needs to detect iris candidates from insides of the set ROIs. With this, the iris detection device 10 according to this embodiment can reduce a processing period for detection of the irises.

The candidate detection unit 13 detects circular regions from the insides of the ROIs. With this, the candidate detection unit 13 detects a plurality of regions to be the iris candidates (plurality of iris candidates). The candidate detection unit 13 detects the circular regions from the images with use of a circle-detection filter. Note that, in order that irises that should be detected (target irises) are not excluded from the iris candidates, the candidate detection unit 13 detects a wide variety of iris candidates.

Figure 2:
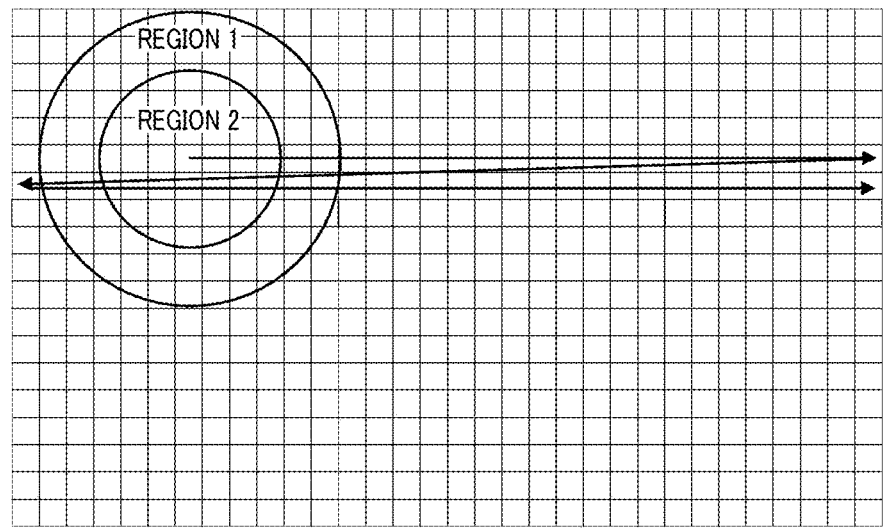
FIG. 2 is an explanatory view of a circle-detection filter.

FIG. 2 is a view showing a configuration of the circle-detection filter. The circle-detection filter is constituted by a circle region 2 and an annular region 1 surrounding an outside thereof. The circle region 2 corresponds to a region where the iris is detected, and the annular region 1, which is located on an outside of the iris, corresponds to a region where a white part (sclera) of the eye is detected. Note that, sizes of the region 1 and the region 2 constituting the circle-detection filter are set as appropriate in accordance, for example, with a distance between the driver and the infrared camera 20. The sizes of the region 1 and the region 2 are set in this way because the size of the region of the iris varies from image to image depending on a position of the driver with respect to the infrared camera 20. The candidate detection unit 13 performs scanning by shifting the circle-detection filter from pixel to pixel so as to calculate average luminance values of the region 1 and the region 2. Then, when a difference between the average luminance of the region 1 and the average luminance of the region 2 (luminance difference η) is larger than a predetermined threshold, the candidate detection unit 13 detects the circle region as the iris candidate. Specifically, the luminance difference η(hereinafter referred to as a separation degree) is calculated from the equations (1).

[Math. 1]

$$\begin{cases} \text{if } (\overline{P_1} > \overline{P_2}) & \eta = \dfrac{\overline{P_1} - \overline{P_2}}{255} \times 1000 \\ \text{else} & \eta = 0 \end{cases} \quad (1)$$

$\overline{P_1}$ : Average luminance of region 1
$\overline{P_2}$ : Average luminance of region 2

The equations (1) are established in accordance with which of the average luminances of the region 1 and the region 2 is higher than another. This is because, at the time of detecting the iris, the region 2 being the region where the iris is detected is lower in luminance than the region 1 being the region where the white outer part of the eye is detected. For this reason, when the region 2 is lower in luminance than the region 1, the candidate detection unit 13 calculates the separation degree η. Meanwhile, when the region 1 is lower in luminance than the region 2, the candidate detection unit 13 may omit the calculation of the separation degree η. In other words, the iris detection device 10 according to this embodiment can simplify a calculation process for detecting the iris candidates based on which of the average luminances of the region 1 and the region 2 is higher than the other.

The candidate narrowing-down unit (candidate pre-selection unit) 14 narrows down the plurality of iris candidates detected by the candidate detection unit 13 into a predetermined number of (for example, three) iris candidates. At the time of performing the narrowing-down into the predetermined number of iris candidates, the candidate narrowing-down unit 14 utilizes data items of images of surroundings of each of the iris candidates. With use of positive examples of a large number of (for example, 5,000) images of the regions of the eye, specifically, images of the iris and its surroundings, the candidate detection unit 13 learns features of images depicting the iris. Neural networks are used in this learning. It is preferred to use an ELM (Extreme Learning Machine) being a high-speed learning scheme of a Single-Hidden Layer FeedForward Neural Network (SLFN). With use of an ELM model obtained by the learning, the candidate narrowing-down unit 14 narrows down the plurality of iris candidates into a top predetermined number of (top "N") iris candidates. Through studies, the inventors of the present application have found that, when the plurality of iris candidates are narrowed down with use of the data items of the images of the surroundings of each of the iris candidates, an actual iris is highly probably contained in the top predetermined number of iris candidates. Based on this finding, in this embodiment, the candidate narrowing-down unit 14 narrows down the plurality of iris candidates into the top predetermined number of iris candidates with use of the data items of the images of the surroundings of the iris candidates. Specifically, the candidate narrowing-down unit 14 narrows down the plurality of iris candidates into the top "N" iris candidates based on results of the learning of the features of the images depicting the iris. Note that, the configuration of this embodiment is not limited to the configuration in which the candidate detection unit 13 learns the features of the images depicting the iris. For example, there may be employed a configuration in which a learning unit (not shown) other than the components of the iris detection device 10 learns the features of the images depicting the iris. In this case, there are no problems as long as the ELM model to be used by the candidate narrowing-down unit 14 at the time of narrowing down the iris candidates is obtained by the learning unit.

The iris specifying unit (iris selection unit) 15 specifies the iris from the predetermined number of iris candidates obtained by the narrowing-down. The iris specifying unit 15 performs matching between gradients of a contour of each of the predetermined number of iris candidates and an iris template. Based on results of the matching, the iris specifying unit 15 specifies one of the iris candidates as the iris. First, the iris specifying unit 15 applies Sobel filters to the images of the regions that may contain the iris so as to calculate a magnitude and a direction of luminance variation from black toward white (gradients of contour). FIG. 3A is a table showing an example of the Sobel filter for calculating a gradient in an X-direction. Further, FIG. 3B is a table showing an example of the Sobel filter for calculating a gradient in a Y-direction. The iris specifying unit 15 calculates the gradients in the X-direction and the Y-direction with use of the Sobel filters shown in FIG. 3A and FIG. 3B. Then, the iris specifying unit 15 calculates magnitudes of the gradients from the equation (2), and calculates directions of the gradients from the equations (3).

[Math. 2]

$$\text{Magnitude of gradient } norm = \sqrt{Ix^2 + Iy^2} \quad (2)$$

$$\text{Direction of gradient } \theta = \begin{cases} \cos^{-1} \dfrac{Ix}{norm} & (Iy \geq 0) \\ 2\pi - \cos^{-1} \dfrac{Ix}{norm} & (Iy < 0) \end{cases} \quad (3)$$

Next, the iris specifying unit 15 performs the matching between each of the predetermined number of iris candidates obtained by the narrowing-down by the candidate narrowing-down unit 14, and the iris template. The iris specifying unit 15 calculates differences between gradients in the template and the gradients of the contour of each of the iris candidates in respective directions in the iris template (respectively in the X-direction and the Y-direction). The iris specifying unit 15 specifies an iris candidate having a smallest sum of the calculated differences as the iris (position of the iris).

Figure 4:
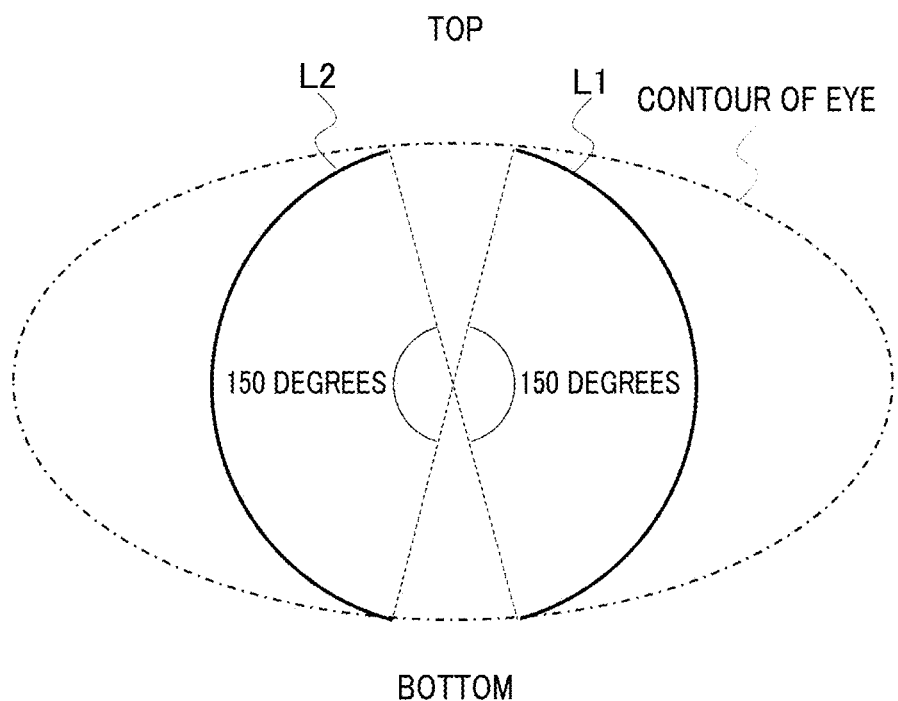
FIG. 4 is a view showing an iris template.

FIG. 4 is a view showing the iris template. The iris template is basically circular, and has the gradients in normal directions of its circumference. In other words, the template has the gradients in directions from a center of the circle toward the circumference. In the iris template, information items (true values) of the gradients are contained in parts corresponding to arcs L1 and L2. Further, upper and lower sides of the circumference are partially excluded from the template. The reason is as follows. Upper and lower sides of the iris are partially covered with eyelids. Thus, when the matching is performed even with respect to gradients of parts corresponding to the eyelids in the iris candidates, the matching may not be accurately performed. For this reason, in this embodiment, the iris specifying unit 15 excludes the parts covered with the eyelids at the time of the calculation of the differences between the gradients in the template and the gradients of the contour of each of the iris candidates. In this way, the iris detection device 10 according to this embodiment is configured to reduce the influence of the gradients of the contour of each of the eyelids on the matching.

Note that, sizes of the iris candidates vary depending, for example, on a positional relationship between the infrared camera 20 and the driver, and hence is not constant. Thus, at the time of the matching, the sums of the differences are normalized by being divided by the number of points on the circumference. The iris specifying unit 15 compares the normalized values with each other, thereby specifying the iris candidate having the smallest sum of the calculated differences as the iris.

The output unit 16 outputs data items of the position of the iris and its radius, which are calculated from the images, to another application. The other application functions, for example, by calculating a direction of a line-of-sight from the position of the iris, and by utilizing this calculated direction of the line-of-sight. As an example of this function, there may be mentioned detection of inattentive driving, assistance in operating in-vehicle devices, or an interface between the vehicle and the driver (HMI).

Note that, in this embodiment, hardware of the iris detection device 10 is constituted by a computer including a CPU, a RAM, a ROM, and a hard disk. Functions of the components of the iris detection device 10 described hereinabove are exerted, for example, by loading an iris detection program recorded onto the ROM corresponding to a non-transitory computer-readable recording medium, and by causing the CPU to execute this program.

Figure 5:
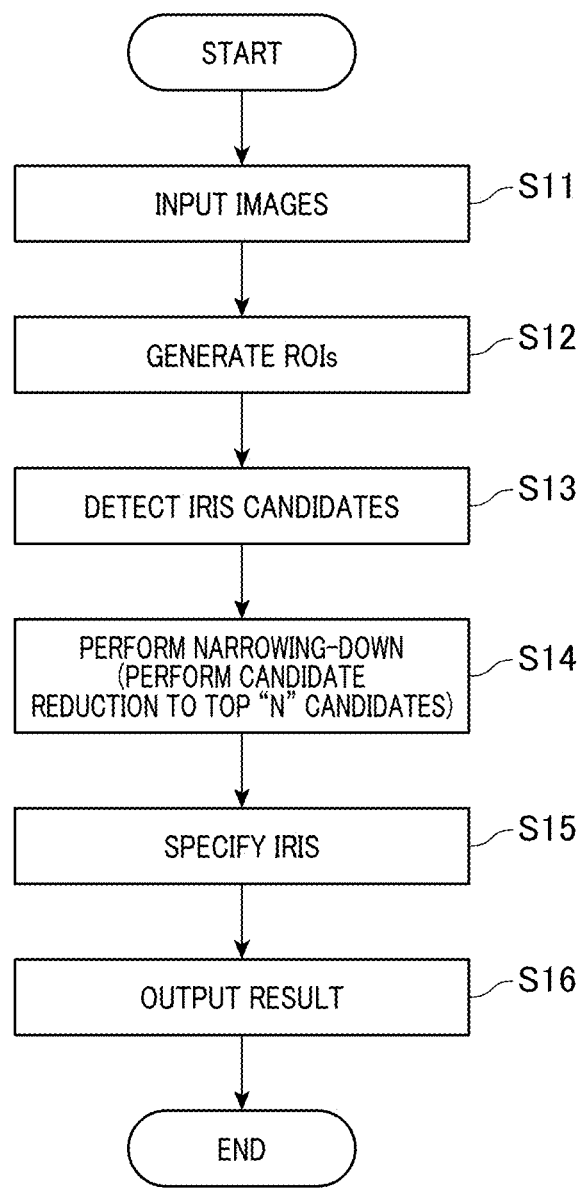
FIG. 5 is a flowchart showing operations of the iris detection device.

FIG. 5 is a flowchart showing operations of detecting the iris by the iris detection device 10. In this embodiment, the iris detection device 10 causes the input unit 11 to accept the driver's images captured by the infrared camera 20 (Step S11). The iris detection device 10 causes the ROI setting unit 12 to specify the regions around the face or the eye in the input images, and to set the ROIs around the specified regions (Step S12). Then, the iris detection device 10 causes the candidate detection unit 13 to detect, with use of the circle-detection filter, the plurality of iris candidates from the insides of the ROIs (Step S13). The iris detection device 10 causes the candidate narrowing-down unit 14 to narrow down the plurality of iris candidates into the top predetermined number of (top "N") iris candidates with use of the ELM model obtained by the learning in advance by using the positive examples (Step S14). Next, the iris detection device 10 causes the iris specifying unit 15 to perform the matching between the gradients of the contour of each of the iris candidates obtained by the narrowing-down and the iris template, and to specify the iris from the top predetermined number of iris candidates (Step S15). The iris detection device 10 causes the output unit 16 to output the data item of the specified iris to the other application (Step S16). The iris detection device 10 according to this embodiment is configured and operated as described hereinabove.

Figure 6:
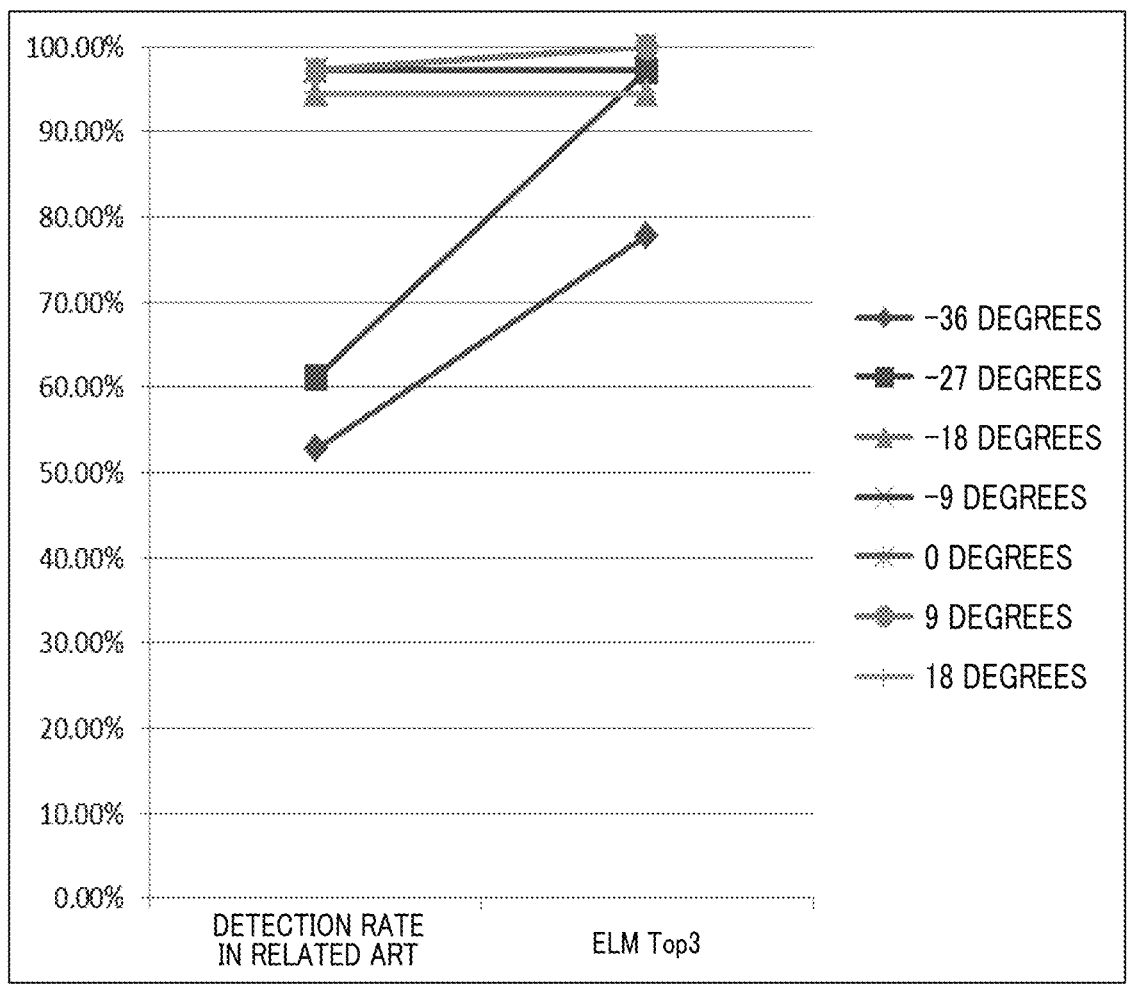
FIG. 6 is a graph showing results of comparisons between detection rates in the related art and possibilities of any of the top three candidates contains an actual iris, the top three candidates being obtained by narrowing-down, with use of an ELM model, a plurality of iris candidates detected by a candidate detection unit.

FIG. 6 is a graph showing results of comparisons between detection rates in the related art and possibilities of any of the top three candidates contains the actual iris, the top three candidates being obtained by the narrowing-down, with use of the ELM model, the plurality of iris candidates detected by the candidate detection unit 13. Angles in the graph are angles of the direction of the line-of-sight of the driver at the time when the images are captured by the camera. For example, it is assumed that a seat on a right-hand side with respect to an advancing direction of the vehicle is a driver's seat. In this case, an angle of 18 degrees is an angle at a time when the driver looks at a door mirror on the driver's seat side. An angle of −27 degrees is an angle at a time when the driver looks at a navigation device. An angle of −36 degrees is an angle at a time when the driver looks at a door mirror on a passenger's seat side. As shown in FIG. 6, at each of the angles of from 18 degrees to −27 degrees, the possibility at which any of the top-three iris candidates obtained by the narrowing-down contains the actual iris exceeds 90%. For this reason, in this embodiment, the narrowing-down into the top predetermined number at the time of narrowing down the iris candidates with use of the ELM model is performed. With this, in this embodiment, an iris candidate that highly probably contains the actual iris is shortlisted as one of the candidates obtained by the narrowing-down. In addition, in this embodiment, the matching of the gradients of the contour of each of the iris candidates is performed with respect to the predetermined number of candidates obtained by the narrowing-down. With this, in this embodiment, the iris can be detected with high accuracy from the images.

Second Embodiment

Next, an iris detection device according to a second embodiment is described. A basic configuration of the iris detection device according to this embodiment is the same as that of the iris detection device 10 according to the first embodiment. Thus, in the following description, the same components as those of the first embodiment are denoted by the same reference symbols, and description thereof is omitted or simplified. The iris detection device 10 according to the second embodiment is different in that the iris specifying unit 15 performs the matching with use of different templates in accordance with positions of the iris.

Figure 7:
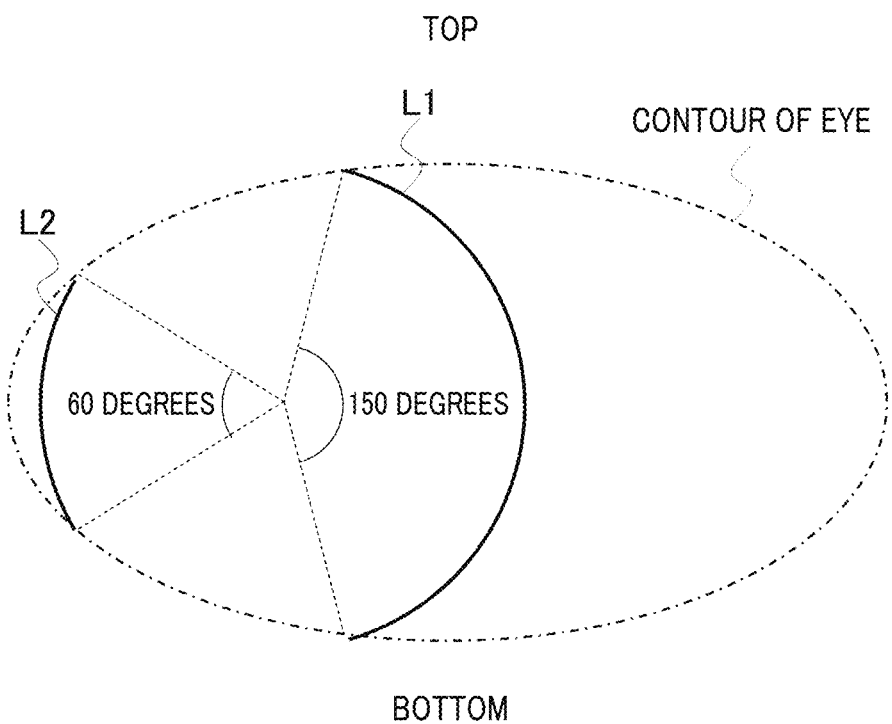
FIG. 7 is a view showing an iris template according to a second embodiment.

FIG. 7 is a view showing the iris template according to this embodiment. In this embodiment, when the driver looks to the right, a proportion at which the upper and the lower sides of the iris are covered with the eyelids is higher on the right-hand side. Thus, in the template to be used when the driver looks to the right, a length of the arc L2 is shorter than a length of the arc L1, and the right-hand side is significantly shortened. Note that, the infrared camera 20 captures a front of the driver. Thus, in the captured images, as shown in FIG. 7, a left-hand side is significantly shortened. Meanwhile, when the driver looks to the left, the proportion in FIG. 7 is reversed. In the template to be used when the driver looks to the left, the length of the arc L2 is longer than the length of the arc L1, and the left-hand side (right-hand side in the captured images) is significantly shortened. In this way, in this embodiment, the iris detection device 10 prepares the different iris templates in accordance with the directions in which the driver looks. Then, the iris detection device 10 switches the templates to be used in accordance with the positions of the iris.

The iris detection device 10 according to this embodiment switches the iris templates to be used at the time of the matching in accordance with the directions in which the driver looks. With this, the iris detection device 10 according to this embodiment can detect the iris with high accuracy from the images irrespective of in which direction the driver looks.

The embodiments of the iris detection device according to the aspect of the technology disclosed herein are described in detail hereinabove with reference to the drawings. However, the technology disclosed herein is not limited to the embodiments described hereinabove.

In the examples of the embodiments described hereinabove, the iris specifying unit 15 specifies the iris from the predetermined number of iris candidates by the matching between the gradients of the contour of each of the iris candidates and the iris template, the predetermined number of iris candidates being obtained by the narrowing-down. The technology disclosed herein is not limited thereto. For example, as another embodiment, the iris specifying unit 15 may specify the iris based on the separation degrees η (evaluation values) calculated at the time when the candidate detection unit 13 detects the iris candidates. In other words, the iris specifying unit 15 specifies an iris candidate having a highest separation degree η as the iris. With this, in the other embodiment, processing load at the time of detecting the iris can be reduced.

In the examples of the embodiments described hereinabove, the iris detection device 10 detects the iris from the image captured by the infrared camera 20. The technology disclosed herein is not limited thereto. For example, as still another embodiment, the iris detection device 10 may detect the iris not only from the images captured by the infrared camera 20, but also from images captured by a normal camera. In that case, the iris detection device 10 detects, for example, skin-color regions from the images with use of information items of colors, and sets the ROIs around the detected regions.

In the examples of the embodiments described hereinabove, the candidate detection unit 13 detects the plurality of iris candidates by detecting the circular regions with use of the circle-detection filter. The technology disclosed herein is not limited thereto. As another example of the method of detecting the plurality of iris candidates, there may be mentioned iris-candidate detection including detecting circles from images with use of the Hough transform being a feature extraction technique.

INDUSTRIAL APPLICABILITY

The technology disclosed herein is utilized as a technology for detecting the iris from the images.

What is claimed is:

1. An iris detection device comprising:
   a candidate detection unit that detects circular regions as iris candidates from images captured by a camera;
   a candidate narrowing-down unit that narrows down the detected iris candidates into a predetermined number of iris candidates with use of data items of images of surroundings of each of the iris candidates; and
   an iris specifying unit that specifies one of the predetermined number of iris candidates obtained by the narrowing-down, as an iris, by matching between gradients of a contour of each of the predetermined number of iris candidates and iris templates.

2. The iris detection device according to claim 1, wherein the iris specifying unit performs the matching with use of a different one of the iris templates in accordance with positions of the iris.

3. The iris detection device according to claim 1, wherein the iris specifying unit specifies the iris based on evaluation values at a time when the candidate detection unit detects the iris candidates.

4. The iris detection device according to claim 1, wherein
   regions of interest are set around regions around an eye in the images captured by the camera, and
   the iris candidates are detected from insides of the set regions of interest.

5. The iris detection device according to claim 1, wherein the candidate narrowing-down unit narrows down the plurality of iris candidates into top "N" iris candidates based on results of learning of features of images depicting the iris.

6. An iris detection method for detecting, by an iris detection device, an iris from images captured by a camera, the method comprising the steps of:
   detecting, by the iris detection device, circular regions as iris candidates from the images;
   narrowing down, by the iris detection device, the detected iris candidates into a predetermined number of iris candidates with use of data items of images of surroundings of each of the iris candidates; and
   specifying, by the iris detection device, one of the predetermined number of iris candidates obtained by the narrowing-down as the iris by matching between gradients of a contour of each of the predetermined number of iris candidates and iris templates.

7. A non-transitory computer-readable recording medium onto which a program for detecting an iris from images captured by a camera is recorded, the program causing a computer to perform the steps of:
   detecting circular regions as iris candidates from the images;
   narrowing down the detected iris candidates into a predetermined number of iris candidates with use of data items of images of surroundings of each of the iris candidates; and
   specifying one of the predetermined number of iris candidates obtained by the narrowing-down as the iris by matching between gradients of a contour of each of the predetermined number of iris candidates and iris templates.

* * * * *